(12) United States Patent
Todini et al.

(10) Patent No.: US 7,013,248 B1
(45) Date of Patent: Mar. 14, 2006

(54) AUTOMATIC PARAMETER ESTIMATION EXTENSION FOR VARIABLE SPEED PUMPS

(75) Inventors: Ezio Todini, Monte S. Pietro (IT); Michael E. Tryby, Thomaston, CT (US); Jack S. Cook, Bethlehem, CT (US); Thomas M. Walski, Nanticoke, PA (US); Robert F. Mankowski, Watertown, CT (US)

(73) Assignee: Haestad Methods, Inc., Waterbury, CT (US)

( * ) Notice: Subject to any disclaimer, the term of this patent is extended or adjusted under 35 U.S.C. 154(b) by 842 days.

(21) Appl. No.: 10/104,714

(22) Filed: Mar. 22, 2002

(51) Int. Cl.
*G06G 7/48* (2006.01)
(52) U.S. Cl. .................... 703/2; 703/7; 703/9
(58) Field of Classification Search ............ 703/2, 703/6, 7, 9; 707/103 R, 203; 717/101
See application file for complete search history.

(56) References Cited

U.S. PATENT DOCUMENTS

| | | | | |
|---|---|---|---|---|
| 5,511,188 | A | 4/1996 | Pascucci et al. | 707/203 |
| 5,758,347 | A | 5/1998 | Lo et al. | 707/103 R |
| 5,787,283 | A | 7/1998 | Chin et al. | 717/101 |
| 6,119,125 | A | 9/2000 | Gloudeman et al. | 707/103 R |
| 6,247,019 | B1 | 6/2001 | Davies | 707/103 R |

OTHER PUBLICATIONS

Daley, A. Control and automation of the Manchester to Liverpool sludge pipeline of the North West Water Authority, IEEE, Power Engineering Journal, vol. 3, No. 4, Jul. 1989, pp. 225-232.*
Carlson, R. The Correct method of Calculating Energy Savings to Justify Adjustavle-Frequency Drives on Pumps, IEEE Transactions on Industry Applications, vol. 36, No. 6, Nov./Dec. 2000, pp. 1725-1733.*
Kleiner et al., F. Performance Characteristics and Design Criteria for High-Speed Adjustable Speed Drivers for Large Turbomachines, IEEE, 36th Annual Petroleum and Chemical Industry Conference, Sep. 1989, pp. 49-58.*
Chen et al., Y.C. Optimized Operation of Water Supply Systems Containing a Mixture of Fixed and Variable Speed Pumps, IEEE, International Conference on Control 1991, Mar. 1991, pp. 1200-1205.*
Chomat et al., M. Optimal Control of Power Unit with Doubly Fed Machine, IEEE International Electric Machines and Drives Conference, 2001, pp. 89-94.*
Galasso, G. Adjustable Speed Operation of Pumped Hydroplants, IEEE, International Conference on AC and DC Power Transmission, Sep. 1991, pp. 424-427.*

(Continued)

*Primary Examiner*—Russell Frejd
(74) *Attorney, Agent, or Firm*—Cesari and McKenna LLP

(57) ABSTRACT

A method for estimating the relative speed factor parameter for a variable speed pump in a hydraulic network sufficient to maintain a fixed pressure at a control node is provided. A desired operating characteristic is determined and this is inserted into a matrix of equations describing the hydraulic system. The largely symmetrical matrix includes certain aspects of the system representing the variable speed pumps which are non-symmetrical. Non-symmetrical portions of the matrix are separated out and solved using an LU factorization technique. Non-sparse, non symmetric matrices are generated and the difference in head correction is solved for to compute the updated nodal head vector and ultimately determine the variable pump speed parameter. The invention allows estimation of the variable speed factor for a variable speed pump drive sufficient to maintain a fixed pressure at a control node. The system fully integrates variable pump speed operation with the status and control capabilities of known hydraulic network solvers.

16 Claims, 6 Drawing Sheets

OTHER PUBLICATIONS

Tan et al., P.C. Modeling and Control of Sewer Flow for Reduced Cost Operation of a Sewage Pumping Station, IEEE Transactions on Systems, Man, and Cybernetics, vol. 18, No. 5, Sep. 1988, pp. 807-813.*

BOSS International., "Boss-International-AirFLOW/SVE—Engineering," http://web.archive.org/web/20010425201312/http://www.sxst.it/Bss_mkn.htm, Apr. 2001, pp. 1-15.

Boulos, Paul F. and Don J. Wood, Explicit Calculation of Pipe-Network Parameters, Journal of Hydraulic Engineering, vol. 116, No. 11, Nov., 1990, pp. 1329-1344.

* cited by examiner

AUTOMATIC PARAMETER ESTIMATION EXTENSION FOR VARIABLE SPEED PUMPS

BACKGROUND OF THE INVENTION

1. Field of the Invention

This invention relates to the design and analysis of water distribution systems and particularly, to variable speed pumps used in such designs.

2. Background Information

In many civil engineering applications, and in particular, in water distribution networks for cities, townships and municipalities, it is of the utmost importance to design such systems accurately and to predict water pipe flow and hydraulic pressure conditions for the water network in any particular area. This is to design, build, maintain, and operate water infrastructure efficiently and to ensure the availability of the potable water resource to the community.

Water distribution systems are often described using software for this purpose. A hydraulic network solver (often commonly referred to as a "solver") is a computer program that simulates and predicts water pipe flow and hydraulic pressure conditions for the links (such as pipes) and the nodes (such as junctions) in such a system. This information is useful and important when designing a new system (for a new subdevelopment) or when designing additional components such as pumps, valves and water storage devices that are to replace aging components or for performing other rehabilitative measures, and to evaluate efficient operating strategies.

One hydraulic network solver that is in use today is the EPANET Solver. This is public domain software that has been adopted for use in the industry and which is made freely available by the U.S. Environmental Protection Agency, of Washington D.C. The EPANET solver uses mathematical matrices to describe the hydraulic system. When solving such matrices for system heads and flows, the EPANET Solver utilizes the Cholesky factorization technique and is highly optimized for the solution of the symmetric matrix that describes the problem.

In general, many factors affect the mathematical representation of a hydraulic network, and in particular, the water pipe flow and hydraulic pressure conditions at any particular point in a network. For example, there are junctions in the network where flow is affected. A valve in a water storage tank or a reservoir may be on or off. Routine day-to-day demand is also an important factor to be taken into consideration when mathematically describing a water distribution system, or portion of such a system.

Fixed speed pumps differ from variable speed pumps in that they operate at a known and constant speed. Since demand can vary throughout the day or other time periods, variable speed pumps adjust their speed in compensation and in so doing adjust flow, improve pressure maintenance, and reduce energy usage. However, it has been difficult for the characteristics of such variable speed pumps to be taken into account appropriately in hydraulic network solvers because of the non-symmetric aspects, which are thus introduced into the matrices providing solutions for a system that includes variable speed pumps.

The mathematical term often used to describe a variable speed pump in a system is a relative speed factor. Existing state of the art hydraulic solvers include the relative speed factor in the calculation of head and flow, but those solvers do not typically calculate or estimate a relative speed factor for a variable pump speed in the system. Instead, they require the user to input the relative speed factor describing the operation of a pump, in the first instance. However, under many circumstances, it would be helpful for a user to be able to determine an optimal relative speed factor for a particular point in the network needed to meet a predetermined operating objective (such as maintaining a constant head). Up to now, this was accomplished using a trial and error process. More specifically, an engineer typically chose a relative speed factor, entered that into the appropriate equation, and then ran the hydraulic network solver to check whether the operating objective has been met. If it was not met to sufficient tolerances, a different relative speed factor was then entered and the program was rerun. This process was repeated until the operating condition had been met. This can be extremely time consuming and tedious. This process is further complicated when practical applications of variable speed pumps are also considered. For example, factors that can affect variable speed pumps and relative speed estimation, include pump scheduling, manual control override, emergency shutdowns and other complex control behaviors.

It has been known to provide variable pump speed features in hydraulic network solvers, but known calculations generally treat the relative speed factor as a user-defined parameter, not a parameter that is calculated or estimated as part of a simulation. Alternatively, in some cases, the variable speed pump relative speed factor is developed by software applications that rely on numerical matrix inversion procedures for sparse non-symmetric matrices such as LU factorization. This, however, can lead to complex, non-symmetric equations which involve cumbersome solutions to those equations and which could also in turn involve use of a large memory capacity in the associated computer.

Furthermore, the EPANET Solver, an accepted basic hydraulic solver software, it does not at present include the ability to make a direct parameter estimation with respect to variable pump speeds, nor does it include control modeling capability that allows the user to model and design pumps with variable speed drives. If the EPANET Solver software application program were to be modified to include this feature, based upon its use of the Cholesky factorization method, this modification would be extremely invasive to the programming with large portions of code needing to be rewritten. This would not only be costly and time consuming, but may even lead to unexpected, or even unreliable, results.

There remains a need, therefore, for a software design which allows the user to model and design water networks with variable speed pumps more effectively and efficiently and which further allows such calculations to be made without the dedication of a large portion of memory storage to such estimations.

There remains a further need to provide an extension to the EPANET Solver program to readily allow variable speed pump parameter estimation.

It is an object of the invention to simplify the calculations needed to estimate variable pump speed relative speed factors and to efficiently and reliably solve the system of non-symmetric equations that describe the problem.

SUMMARY OF THE INVENTION

The disadvantages of prior techniques have been overcome by the present invention which provides an automatic parameter estimation method for variable speed pumps. The method of the present invention estimates the relative speed factor for a variable speed pump drive sufficient to maintain a fixed pressure at a control node (such as a junction, reservoir or tank) in the hydraulic system. In addition, the method of the present invention also allows simulation of a variable speed pump drive sufficient to maintain a fixed flow through the pump. The method fully integrates the variable speed pump operation with the status and control capabilities of a known hydraulic network solver, the EPANET Solver.

More specifically, the method of direct parameter estimation includes determining a desired operating characteristic such as a target head and target pressure to be achieved at a predetermined point in the hydraulic system. A point in the hydraulic system can be defined as a particular node (which may also be referred to herein as a junction). Junctions occur at the intersection of two particular links (which may also be referred to herein as pipes). A matrix of equations is generated, describing the fundamental energy and flow balances that must be satisfied for solution of the hydraulic system. This matrix is largely symmetrical, however, certain aspects of the system (representing the variable speed pump, i.e. rows relevant to the newly introduced head increments in the pipes with variable speed pumps) are non-symmetric. To address this aspect of the procedure, the software of the present invention introduces the variation in speed of a pump as a simple variation in head (H) in a special "pipe" describing the pump in the equations. The software then reformulates the problem to take advantage of the symmetrical part of the matrix. The matrix is thus divided into its symmetrical part and its non-symmetrical part. The sparse symmetrical system is then solved together with a number, equal to the number of variable speed pumps, or additional systems. The result if then used to produce a new non-sparse, non-symmetric matrix in which rank is equal to the number of variable speed pumps. Then, in accordance with the invention, a difference in head correction related to the variable speed pump, is computed using LU factorization technique. Updated nodal head and link flow vectors are then computed. Given the head and flow at the variable speed pump the software determines the relative speed factor that meets the desired operating characteristic using the Newton-Raphson search technique.

This can all be performed while the original symmetric matrix is preserved. More specifically, if the system does not include variable speed pumps, then the usual, symmetrical matrix is solved. Alternatively, if a variable speed pump does exist in the network, yet it is in the OFF state, then the basic matrix once again is solved.

Alternatively, when a variable speed pump is part of the network, and is in an ON state, then the solution to the non-symmetrical portion is separated out of the matrix, is solved separately, and then the information is recombined, in accordance with the present invention.

In accordance with another aspect of the present invention, the method of the present invention can be readily employed with the freely available hydraulic network solver EPANET without requiring invasive modification to that software.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
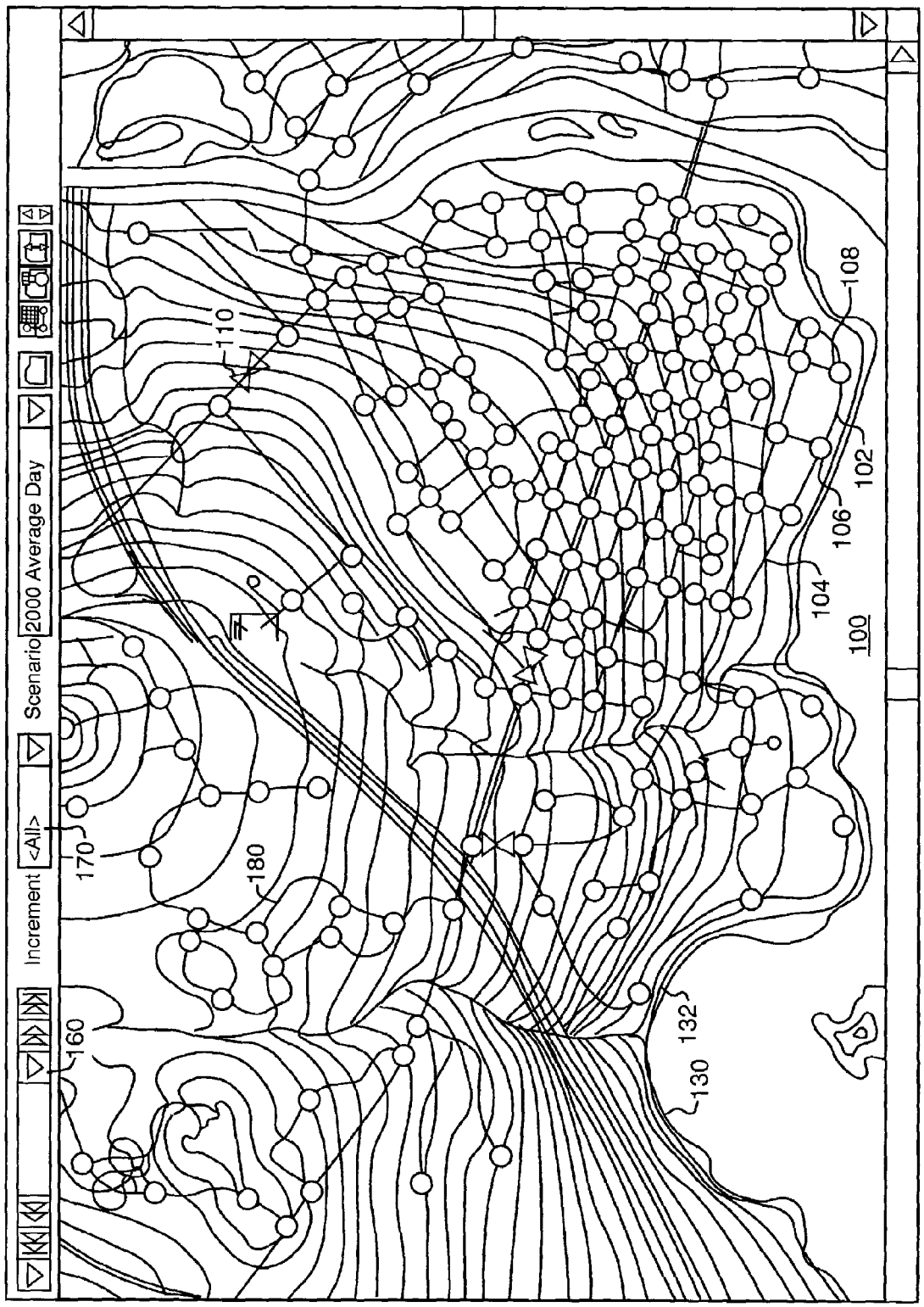
FIG. 1A is a schematic screen shot of a user interface of a hydraulic network solver program.

Hydraulic systems can be designed and described using hydraulic network solver software, that employs a hydraulic calculation engine. This software is used to solve flow continuity and head loss equations that characterize the hydraulic state of the pipe network at a given point in time. A user interface of a hydraulic network solver software program is illustrated in FIG. 1A. In FIG. 1A, the hydraulic network 100 is made up of a series of links (also referred to herein as pipes) such as the pipes 102, 104. The pipes are connected at nodes (also referred to herein as junctions), such as the junctions 106, 108. The network 100 may also include valves such as the valve 110 and variable speed pumps such as the variable speed pump 112. The multiple isometric lines, such as the lines 130, 132, upon which the network 100 is superimposed, are topological lines that illustrate the geography of the area in which the hydraulic network 100 is located.

As noted, flow continuity and headloss equations characterize the hydraulic state of the pipe network 100 at a given point and time. Many different approaches are available for solving such equations. The EPANET Solver and the invention use the hybrid node-loop form of these equations. The equations are solved iteratively for nodal heads using various parameters that describe headloss—pipe length, internal diameter, roughness, and flow rate—and other characteristics of the system that can vary depending on time of day, usage, and operator control. Users of hydraulic network software enter information about the duration of the simulation and the hydraulic time step increment, and the time of day, as illustrated in window 160, and time increments, illustrated in window 170 are presented with the simulation results in the user interface.

Typically, the hydraulic equations are solved and a trial solution is obtained in order to design new portions of the network, such as the pipes shown in gray in area 180 in FIG. 1A, which may be added when a new subdevelopment is created. Alternatively, aging pipes in the networks may need replacing, and simulations need to be run to determine the network behavior in both examples. All of this can be determined using hydraulic network solver software that employs mathematical matrices of equations which describe the system 100.

Variable speed pump drives are utilized in water distribution systems such as the system 100 of FIG. 1A to improve energy efficiency and the operating characteristics of a hydraulic system. Behavior of variable speed pump drives can be described using a relative speed factor which is a unitless coefficient which is utilized in the hydraulics equations which are discussed in further detail herein. The hydraulic engine solves these equations and this is used to design or to simulate hydraulic systems.

Figure 1B:
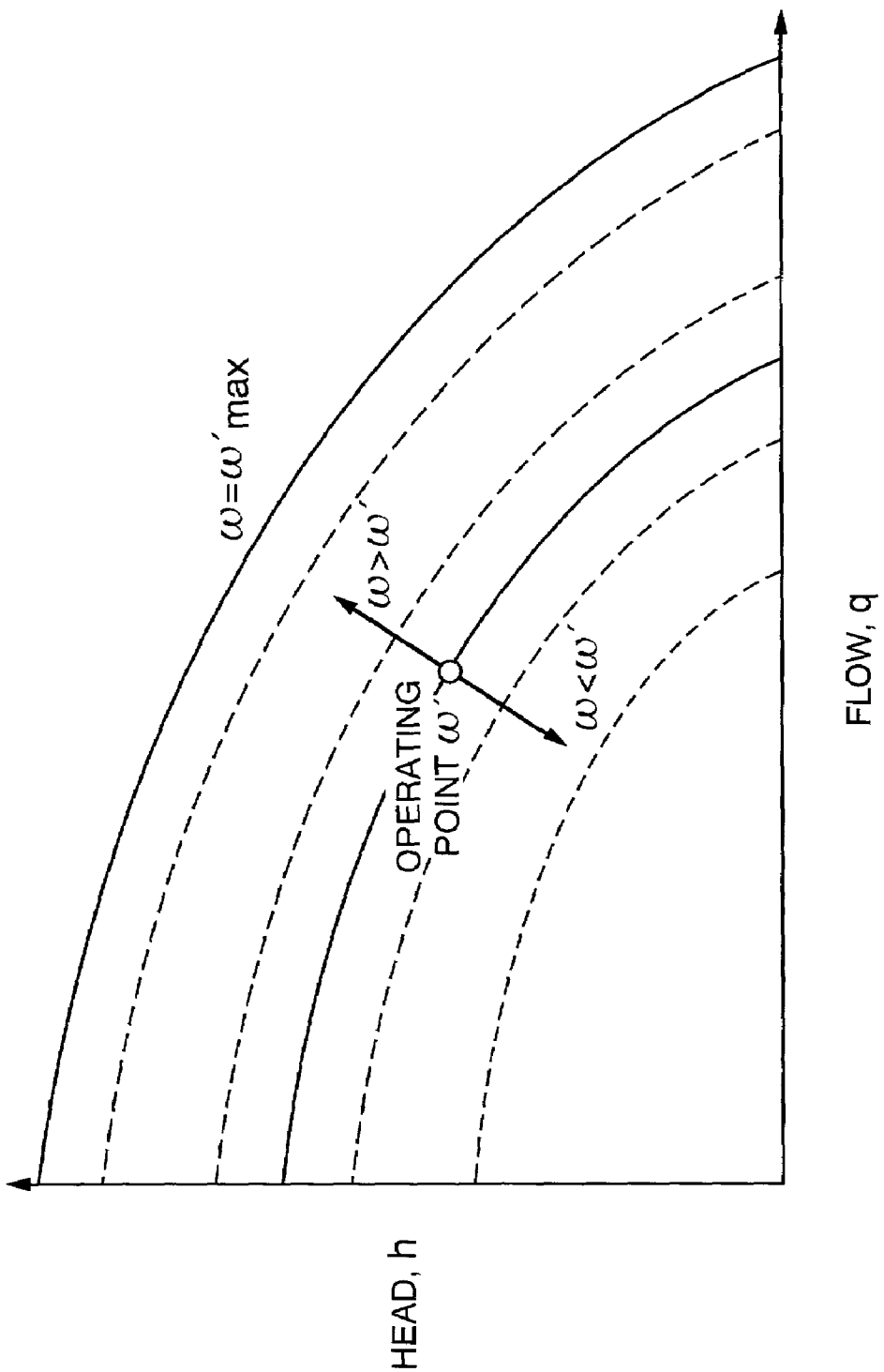
FIG. 1B is a plot showing the characteristic curve of a pump and the effect of changes in the relative speed factor on the curve.

FIG. 1B illustrates the characteristic curve of a hydraulic pump which relates head (H), which is a measurement of pressure of a fluid expressible in height, and flow (Q), which is a measure of flow rate of the fluid. A relative speed factor ω is a unitless multiplier to rotational speed, and is used to describe the effect that changes in pump rotational speed have on the pumps characteristic curve. Three quantities, the current operating head, flow, and speed of the pump define an operating point, ω', on the characteristic curve. In order to meet an operating objective, such as maintaining a constant head, the pump can increase, ω>ω', or decrease, ω<ω', its rotational speed relative to the current operating point, causing a translation of the characteristic curve as indicated in FIG. 1B. The relative speed factor can increase to meet operating objectives up to a point $\omega=\omega_{max}$, that is defined by the user. In practical terms, the algorithm proposed here computes the flow and head the pump must produce to satisfy an operating objective, and then computes the (o that places the required operating point on a translated characteristic curve.

Figure 2:
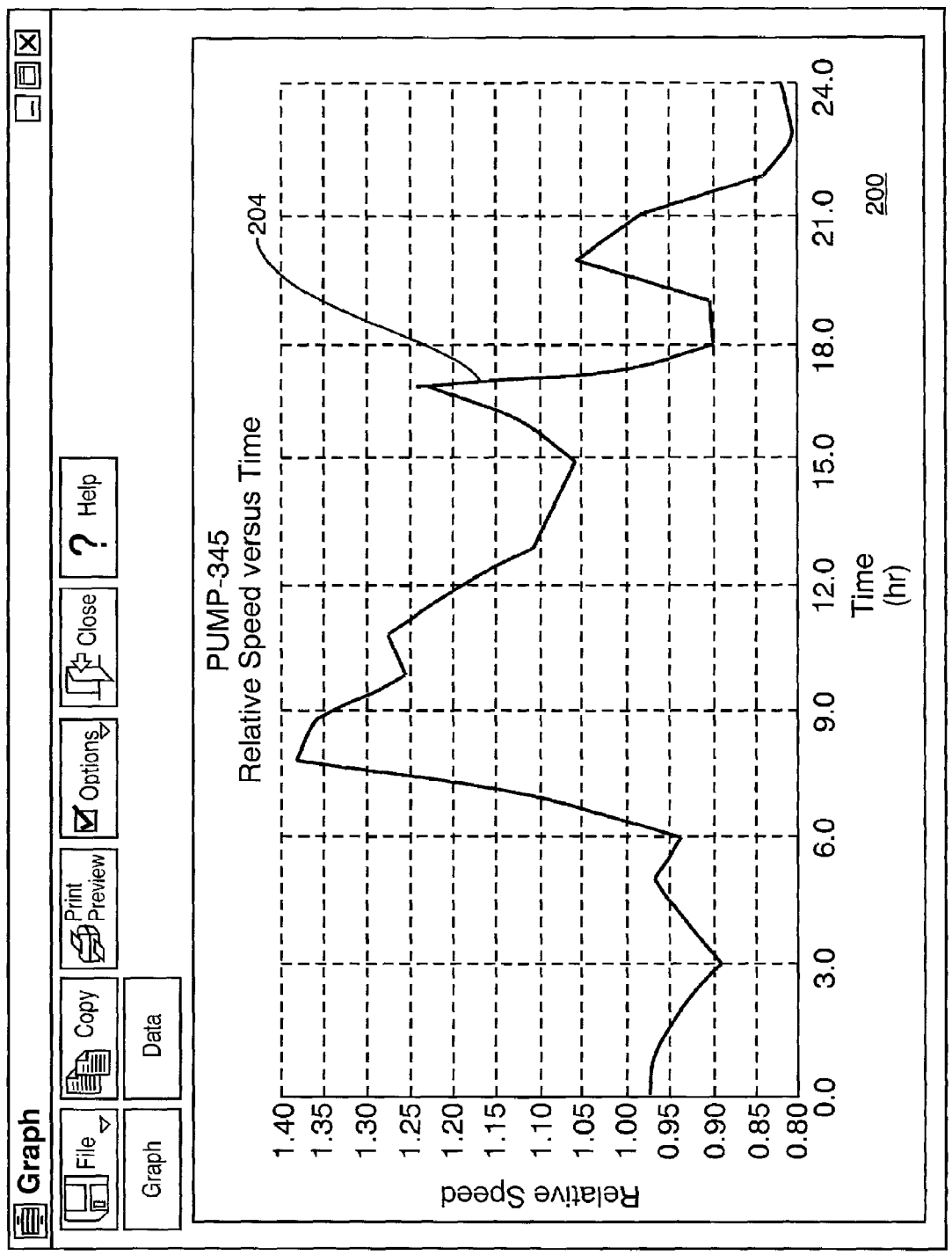
FIG. 2 is a graph describing a variable speed pump in which relative speed is plotted against time.

FIG. 2 illustrates a graph 200 in which the relative speed factor is plotted along the y-axis versus time (x-axis). As illustrated in FIG. 2, the relative speed factor varies with time in a typical hydraulic system, as shown by the curve 204. This is because the pump speed changes in response to demand conditions throughout the 24-hour period. On the day illustrated in graph 200 of FIG. 2, the curve 204 illustrates the change in the relative speed factor for a particular pump, for example PMP 345 in the example, over the course of a 24-hour period.

Although it has been known to calculate relative speed factors at certain points in time, or to simulate relative speed factors, up to now it has not been straightforward to determine a relative speed factor that is required to meet an operating objective such as a constant head. Conventionally, this has been a trial-and-error process. In accordance with the present invention, the software application programming the user to select a target head (for example) and then to determine the relative speed factor for a particular pump in the system to achieve that target head.

Figure 3:
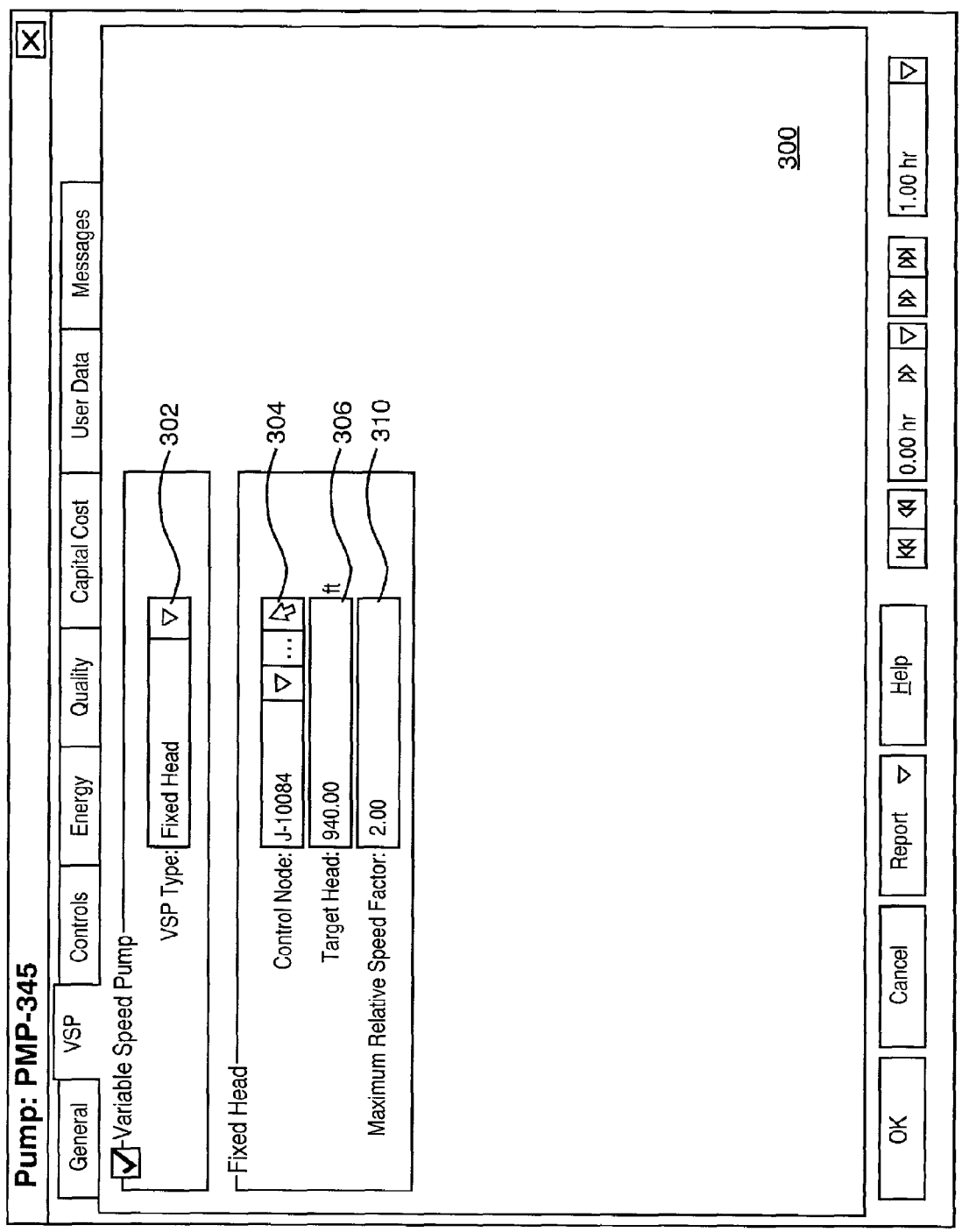
FIG. 3 is a schematic screen shot of a user interface of a the hydraulic network solver extension of the present invention in which the user may select a desired target head value.

By way of example, FIG. 3 illustrates a user interface 300, which relates specifically to a selected pump in the system, the pump PMP 345. Using the interface, the user can define the pump as a fixed head type, as shown in window 302. The user next identifies the control node J-10084, as illustrated in window 304, at which the head produced by the pump is measured. This may also already by available and will be automatically is inserted for the user by the software based on the information already stored about the network. Next, the user selects a target head to be set as the desired operating characteristic. In the example, it is set at 940.00 feet, as illustrated in window 306. The maximum relative speed factor is the upper boundary of operation for the pump drive. In the example the maximum relative speed factor is set to 2.00 as illustrated in the window 310.

Figure 4:
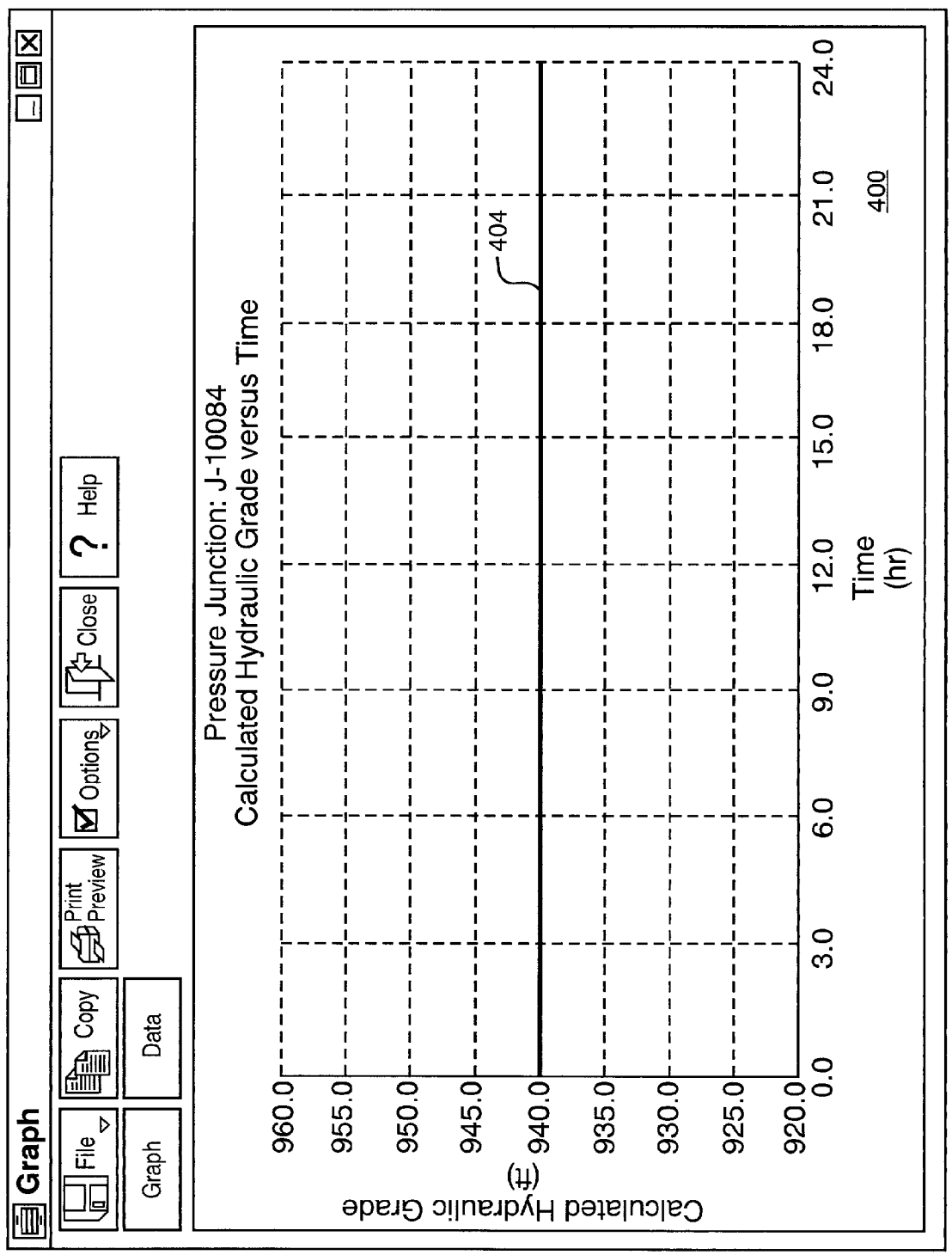
FIG. 4 is a graph describing a pressure junction in which calculated hydraulic grade is plotted versus time.

The behavior of the pump PMP 345 at the pressure junction J-10084 can be measure over time, and graphed. This is illustrated in FIG. 4 by the graph 400. The graph 400 illustrates calculated hydraulic grade in feet along the y-axis versus time (x-axis). The curve 404 (which is actually a straight line because the head is constant) illustrates the target head being maintained over the full time period, at a constant of 940.00 feet. Thus, the desired operating condition has been met.

More specifically, and for purposes of providing a more detailed description, the mathematics underlying the background of the calculations will be described. Briefly, the EPANET Program, and hydraulic calculation engines derived from it, solve flow continuity and head loss equations that characterize the hydraulic state of the pipe network at a given point in time. The approach for solving these equations adopted by EPANET is that of Todini and Pilati (1987) termed the Global Gradient Algorithm (GGA) or alternately the Hybrid Node-Loop Method. For purposes of clarity of illustration, we will derive the equations describing the GGA.

Assume a pipe network with N junction nodes and NF fixed grade nodes (tanks and reservoirs). The flow-headloss relation in a pipe between nodes i and j can be given as:

$$H_i - H_j = h_{i,j} = rQ_{ij}^n + mQ_{ij}^2 \quad (1)$$

where H=nodal head, h=headloss, r=resistance coefficient, Q=flow rate, n=flow exponent, and m=minor loss coefficient. The value of the resistance coefficient will depend on which friction headloss formula is being used (see below). For pumps, the headloss (negative of the head gain) can be represented by a power law of the form:

$$h_{ij} = -\omega^2(h_0 - r(Q_{ij}/\omega)^n) \quad (1a)$$

or, $$h_{ij} = -(a_0\overline{\omega}^2 + b_0 Q\overline{\omega} + c_0 Q^2) \quad (1b)$$

for pumps, where $h_0$ is the shutoff head for the pump, ω is a relative speed factor, and r and n are the pump curve coefficients. The second set of equations that must be satisfied is flow continuity around all nodes:

$$\sum_j Q_{ij} - D_i = 0 \text{ for } i = 1, \ldots N \quad (2)$$

where $D_i$ is the flow demand at node i and by convention, flow into a node is positive. For a set of known heads at the fixed grade nodes, we seek a solution for all heads $H_i$ and flows $Q_{ij}$ that satisfy Eqs. (1) and (2).

Following Todini and Pilati (1987) notation, the problem can be formulated as the solution of the following non-linear matrix equation:

$$\begin{bmatrix} A_{11} & \vdots & A_{12} \\ \ldots & \ldots & \ldots \\ A_{21} & \vdots & 0 \end{bmatrix} \begin{bmatrix} Q \\ \ldots \\ H \end{bmatrix} = \begin{bmatrix} -A_{10}H_0 \\ \ldots \\ -q \end{bmatrix} \quad (3)$$

where $A_{11}$ is a diagonal matrix which elements are:

$$A_{11}(i,i) = r|Q_{ij}|^{n-1} + m|Q_{ij}| \quad (4)$$

for pipes and:

$$A_{11}(i,i) = -\omega^2(h_0 - r(Q_{ij}/\omega)^n)/Q_{ij} \quad (5)$$

or:

$$A_{11}(i,i) = -(a_0\omega^2/Q_{ij} + b_0\omega + c_0 Q_{ij}) \quad (6)$$

(or other similar equations) for pumps. Note that in reality all the coefficients, r, m, n, ω, $a_0$, $b_0$, $c_0$ are relevant to specific pipes or pumps; the i,j indexes have been omitted to improve readability.

The topological matrices describe the node pipe connectivity of the network (which pipes are connected to one another via which nodes) are symmetrical, that is $A_{12} = A_{21}^T$. A coefficient value of one, 1, means that pipe flow is positive and is assumed to enter in the relevant node, minus one, −1, means the flow is taken to exit from the node and zero, 0, indicates that the node and the pipe are not topologically connected.

The vector of link flows and nodal heads, Q and H respectively are the unknowns being solved for. The right hand side of the equation consists of the vector of known fixed heads and fixed demands, $H_0$ and q, respectively. The topological matrix $A_{10}$ relates the fixed grade nodes to the head equations written for the links they are connected to.

Both sides of the system of nonlinear equations (1) are differentiated with respect to Q and H, resulting in a linear system of equations.

$$\begin{bmatrix} D & \vdots & A_{12} \\ \cdots & \cdots & \cdots \\ A_{21} & \vdots & 0 \end{bmatrix} \begin{bmatrix} dQ \\ \cdots \\ dH \end{bmatrix} = \begin{bmatrix} dE \\ \cdots \\ dq \end{bmatrix} \quad (7)$$

where D is a diagonal matrix which elements are $$D(i,i) = nr|Q_{ij}|^{n-1} + 2m|Q_{ij}| \quad (8)$$

for pipes and:

$$D(i,i) = nr\omega^{2-n}|Q_{ij}|^{n-1} \quad (9)$$

or:

$$D(i,i) = -(b_0\omega + 2c_0 Q_{ij}) \quad (10)$$

for pumps according to the chosen model.

A system of linear equations can then be written and which can be solved using an iterative Newton-Raphson technique. At each iteration, the Jacobian matrix A is numerically inverted using a Cholesky factorization, a procedure that is optimized for symmetrical systems of equations. Ultimately, the system of equations describing the network can be solved, however, relative speed factor, ω, is treated as a known parameter describing the pump's operation such as that shown in equations (5) and (6) and (9) and (10). Pump speed ω cannot be estimated or calculated using this procedure.

In the case of variable speed pumps, the problem can still be formulated as the solution of the following non-linear matrix equation, following Todini and Pilati (1987) notation:

$$\begin{bmatrix} A_{11} & \vdots & A_{12} \\ \cdots & \cdots & \cdots \\ A_{21} & \vdots & 0 \end{bmatrix} \begin{bmatrix} Q \\ \cdots \\ H \end{bmatrix} = \begin{bmatrix} -A_{10}H_0 \\ \cdots \\ -q \end{bmatrix} \quad (11)$$

where $A_{11}$ is a diagonal matrix which elements are:

$$A_{11}(i,i) = r|Q_{ij}|^{n-1} + m|Q_{ij}| \quad (12)$$

for pipes and:

$$A_{11}(i,i) = -\omega^2(h_0 - r(Q_{ij}/\omega)^n)/Q_{ij} \quad (13)$$

or:

$$A_{11}(i,i) = -(a_0\omega^2/Q_{ij} + b_0\omega + c_0 Q_{ij}) \quad (14)$$

(or other similar equations) for pumps. Note that in reality all the coefficients, r, m, n, ω, $a_0$, $b_0$, $c_0$ are relevant to specific pipes or pumps; the i,j indexes have been omitted for readability.

Given that different equations are available for modeling the pumps, it is convenient to introduce the variation of speed as a simple variation in head in the relevant special pipe (or connections) describing the pump. This will avoid adding new non linear terms in the matrix equations.

In other words, for the pump connections, ω will be set to 1.0 (another constant could do as well, but 1 is most convenient) and the relevant pipe equations will result into:

$$H_i - H_j = -(h_0 - rQ_{ij}^n) + \delta_{ij} \quad (15')$$

or $$H_i - H_j = -(a_0 + b_0 Q_{ij} + c_0 Q_{ij}^2) + \delta_{ij} \quad (16')$$

with the $A_{11}$ corresponding terms defined as:

$$A_{11}(i,i) = -(h_0 - rQ_{ij}^n)/Q_{ij} \quad (15'')$$

or:

$$A_{11}(i,i) = -(a_0/Q_{ij} + b_0 + c_0 Q_{ij}) \quad (16'')$$

according to the chosen formula for pumps.

At this point one or more unknown heads are eliminated from the vector H, for example fixing the head at a junction instance where the demand is already known, or fixing the demand at a tank where the head is already known. By introducing the new unknowns $\delta_{ij}$ as additional components of vector H either in the location of the newly fixed heads or in new locations, when one wants to impose the demand in a fixed head node, the system can still be represented by equation (11), but in this case the relation $$A_{12} = A_{21}^T,$$

which characterizes the standard formulation of the GGA is no longer valid. When variable speed pumps have been introduced, this results into $$A_{12} \neq A_{21}^T,$$

and the system matrix is no longer symmetric.

Now, similar to the original derivation just described, the application of the GGA leads to the following system of linear equations.

$$\begin{bmatrix} D & \vdots & A_{12} \\ \cdots & \cdots & \cdots \\ A_{21} & \vdots & 0 \end{bmatrix} \begin{bmatrix} dQ \\ \cdots \\ dH \end{bmatrix} = \begin{bmatrix} dE \\ \cdots \\ dq \end{bmatrix} \quad (17)$$

where D is a diagonal matrix which elements are $$D(i,i) = nr|Q_{ij}|^{n-1} + 2m|Q_{ij}| \quad (18)$$

for pipes and:

$$D(i,i) = nr|Q_{ij}|^{n-1} \quad (19)$$

or:

$$D(i,i) = -(b_0 + 2c_0 Q_{ij}) \quad (20)$$

for pumps according to the chosen model.

Equation (17) can be written assuming a local linearisation between the solution at iteration k and that at iteration k+1, by defining:

$$dQ = Q^k - Q^{k+1}$$

$$dH = H^k - H^{k+1}$$

$$dE = A_{11}Q^k + A_{12}H^k + A_{10}H_0$$

$$dq = A_{21}Q^k + q \quad (21)$$

Again, the system of linear equations (17) is now ready for a solution using an iterative Newton-Raphson technique. The Jacobian matrix A is largely symmetrical. However, the rows and columns that are non-symmetrical are the rows relevant to the newly fixed nodes and the columns relevant to the newly introduced head increments in the pipes with variable speed pumps. Therefore the problem can be reformulated to take advantage of the symmetrical part of the matrix, by rewriting the matrix A into its symmetrical and non-symmetrical parts.

In mathematical terms, the system matrix A is rewritten into its symmetrical part and non-symmetrical part as follows.

$$A_{12} = [A_{12}^s \vdots A_{12}^n] \quad A_{21} = \begin{bmatrix} A_{21}^s \\ \ldots \\ A_{21}^n \end{bmatrix} \text{ where } A_{12}^s = (A_{21}^s)^T, \text{ while}$$

$A_{12}^n \neq (A_{21}^n)^T$ The matrix $$A = A_{21}D^{-1}A_{12} = \begin{bmatrix} A_{21}^s \\ \ldots \\ A_{21}^n \end{bmatrix} D^{-1}[A_{12}^s \vdots A_{12}^n] \quad (22)$$

$$= \begin{bmatrix} A_{21}^s D^{-1} A_{12}^s & \vdots & A_{12}^s D^{-1} A_{12}^n \\ \ldots & \ldots & \ldots \\ A_{21}^n D^{-1} A_{12}^s & \vdots & 0 \end{bmatrix}$$

$$= \begin{bmatrix} A_{ss} & \vdots & A_{sn} \\ \ldots & \ldots & \ldots \\ A_{ns} & \vdots & 0 \end{bmatrix}$$

Matrices $A_{ss}$, $A_{sn}$ and $A_{ns}$ can be easily set up due to the specific nature of matrices $A_{12}^s$, $A_{21}^s$, $A_{12}^n$ and $A_{21}^n$. $A_{ss}$ is the symmetrical part of the original matrix A from which rows and columns corresponding to the newly fixed head nodes have been eliminated. $A_{sn}$ is a matrix formed by the columns and $A_{ns}$ from the rows eliminated from the matrix A.

The original problem of equation (22) can now be solved as:

$$\begin{bmatrix} H^{k+1} \\ \ldots \\ \ddot{A}^{k+1} \end{bmatrix} = \begin{bmatrix} A_{ss} & \vdots & A_{sn} \\ \ldots & \ldots & \ldots \\ A_{ns} & \vdots & 0 \end{bmatrix} \begin{bmatrix} F_1 \\ \ldots \\ F_2 \end{bmatrix}. \quad (23)$$

Where $F_1$ and $F_2$ equal:

$$F_1 = A_{21}^s Q^k + q - A_{21}^s D^{-1} A_{11} Q^k - A_{21}^s D^{-1} A_{10} H_0 \quad (24)$$

$$F_2 = A_{21}^n Q^k + q_0 - A_{21}^n D^{-1} A_{11} Q^k - A_{21}^n D^{-1} A_{10} H_0 \quad (25)$$

As one can see the problem is now the following. Solve the usual sparse symmetrical system (as in the case without variable speed pumps).

$$x = A_{ss}^{-1} F_1 = CHOL(A_{21}^s D^{-1} A_{12}^s) F_1 \quad (26)$$

If variable speed pumps are not included in the problem, then $$H^{k+1} = x \quad (27)$$

Otherwise, when variable speed pumps are included, solve as many additional symmetrical systems as the number of variable speed pumps:

$$C = A_{ss}^{-1} A_{sn} = CHOL(A_{21}^s D^{-1} A_{12}^s) A_{sn} \quad (28)$$

Set up the following non-sparse, non-symmetric matrix which rank is equal to the number of variable speed pumps:

$$A_{ns} A_{ss}^{-1} A_{sn} = A_{ns} C \quad (29)$$

and solve for $\ddot{A}^{k+1}$ using LU factorization for nonsymmetrical matrices as follows, $$\ddot{A}^{k+1} = LU(A_{ns}C)(A_{ns}x - F_2) \quad (30)$$

from which it is possible to compute the updated nodal head vector:

$$H^{k+1} = x - C\ddot{A}^{k+1} \quad (31)$$

and the updated link flow vector:

$$Q^{k+1} = Q^k - D^{-1} A_{11} Q^k - D^{-1} A_{12}^s H^{k+1} - D^{-1} A_{12}^n A\ddot{A}^{k+1} - D^{-1} A_{10} H_0 \quad (32)$$

Finally, substituting $Q_{ij}$ and $h_{ij}$ into Equations (1a) or (1b) depending on the equation chosen to represent the pump, and setting the equation equal to zero one obtains an equation that is solely a function of omega, $f(\omega)$. The unknown which we wish to obtain satisfies the root of the equation and can be found by applying a simple one dimensional gradient search procedure to solve one scalar equation for each pump.

The advantage of this algorithm lays in the fact that if a sparse symmetric matrix Gaussian elimination routine is used, one can solve at the same time $A_{ss}^{-1} F_1$ and $A_{ss}^{-1} A_{sn}$ with a very small increase in computation, while the non-symmetric component is reduced to the solution of a small full non-symmetric system that can be easily solved. In addition, if variable speed pumps are not included in the problem, the solution is identical to the original one without variable speed pumps.

In the case of variable speed pumps operating to maintain a fixed flow the method of the proposed invention does not allow the estimation of the relative speed factor as described above. Instead the algorithm mimics the affect of a change in the relative speed factor by the pump controller by updating the $Q_{ij}$ according to the following equation:

$$Q_{ij}^{k+1} = Q_{ij}^k = Q_{fixed} \quad (33)$$

where $Q_{fixed}$ is the desired fixed flow to be maintained at pump ij.

Figure 5:
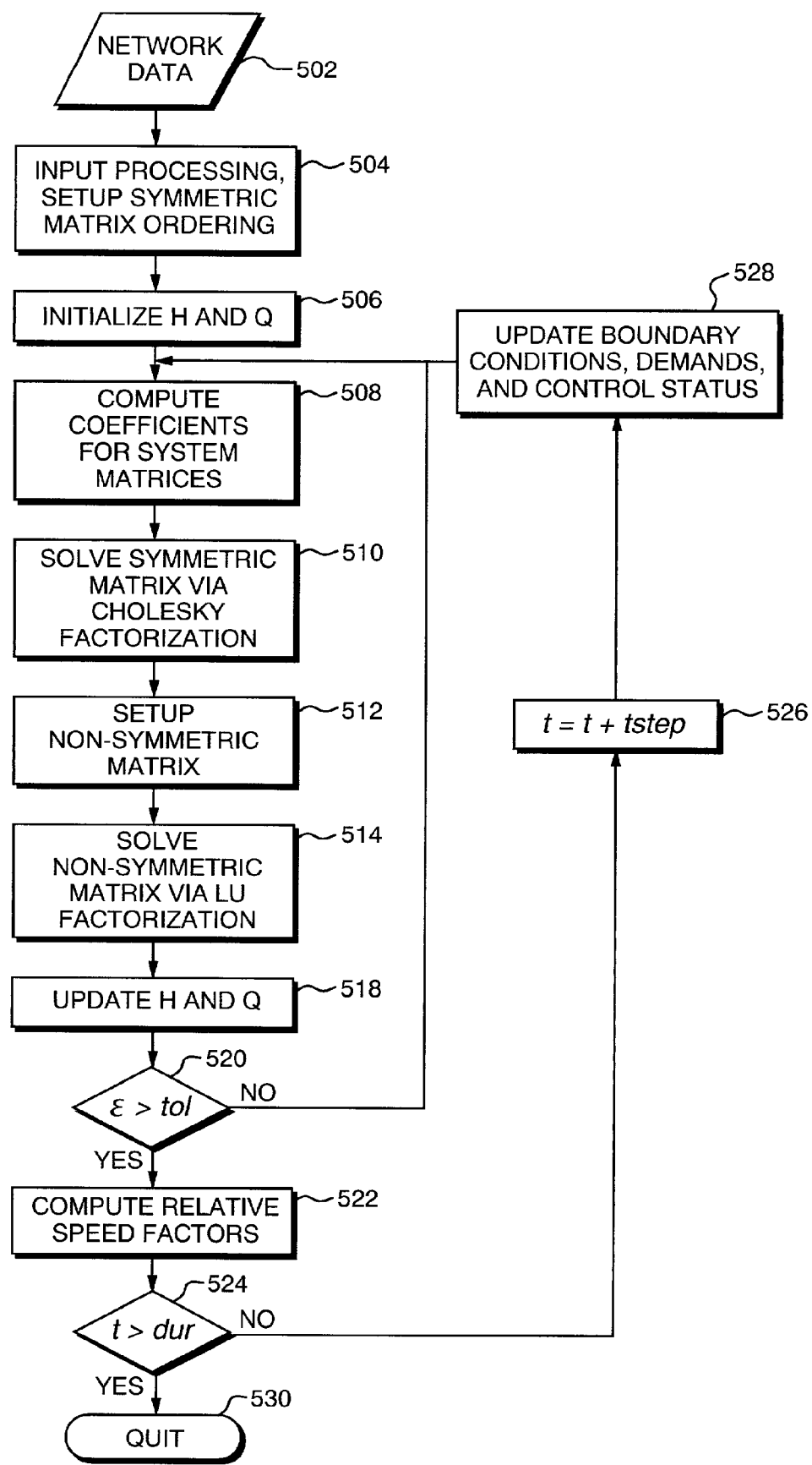
FIG. 5 is a flow chart describing the steps of the method of the present invention.

Now, in accordance with the invention proposed here, it is easy to describe the steps of the algorithm as illustrated in FIG. 5. Unlike the mathematical development that illustrates the necessity of separating the symmetric and non-symmetric parts of the system matrix, within the algorithm the matrices are understood to be partitioned from the onset.

First the data describing the network to be simulated is loaded into the algorithm as shown in step 502 (FIG. 5). The data describing the network is transferred into the program via a standard text based input file. In the file the user selects a desired operating characteristics, such as prescribing which pumps are equipped with variable frequency drives and the desired target head they are to maintain. The input data is processed and the software generates the relevant energy and mass balance equations for the network, as shown in step 504. With the topological characteristics of the network and therefore the form of the system matrix A known, the coefficients in the matrix are reordered to minimize backfill during the Cholesky factorization procedure. Thus, the algorithm is highly optimized for the solution of the symmetric partition of the system matrix, step 504. Next, the vector of unknowns H and Q are initialized in preparation for the first Newton-Raphson iteration of the GGA, step 506.

The GGA is a two looped iterative procedure that solves the system of network mass and flow balance equations through time. The Newton-Raphson iterative procedure, starts after step 506 and follows the inner loop shown in FIG. 5, solves the symmetric and non-symmetric system of equations, updates the solution vector, and computes an error criterion $-\epsilon$. The procedure terminates if $\epsilon$ is less than a prescribed error tolerance tol, otherwise the iterations continue until the maximum number of iterations allowed has been exceeded. The outer loop, illustrated in FIG. 5, gradually steps the algorithm through simulation time when Extended Period Simulations (EPS) are performed. When the Newton-Raphson procedure has converged the current time in the simulation t is compared against the desired duration of the simulation dur. If the current simulation time is greater than the duration the procedure terminates, otherwise the simulation time is updated in step 526 and the boundary conditions, demands, and control status of the network is updated, step 528, prior to the next Newton-Raphson loop.

The first step of each Newton-Raphson iteration is the computation of the matrix coefficients for the symmetric and non-symmetric partitions of the system matrix. These coefficients are a function of the solution vector H and Q, updated at the end of the previous iteration, and of the boundary conditions, demands, and control status updated at the beginning of each hydraulic time step, step 528. Once the matrix coefficients have been computed, the symmetric partition of the system matrix is solved according to Equation (26). If no variable speed pumps are present in the network being solved, or if there are but their control status is off, the algorithm skips to step 518, the solution vectors H and Q are updated according to Equations (27) and (32), and the procedure continues until the error is suitably small.

In the case of variable speed pumps being present in the network and their control status being on, the procedure performs steps 508 and 510 as described immediately above and then in step 512 the non-symmetric partition of the system matrix is setup for solution according to Equations (28) and (29). The non-symmetric partition of the system matrix is then solved for the delta head required to meet the fixed head requirement imposed on the variable speed pump in step 514 according to Equation (30). In step 518 the solution vectors H and Q are updated according to Equations (31) and (32), or in the case of a fixed flow pump ij, $Q_{ij}$ is updated according to Equation (33), and the procedure continues until $\epsilon<$tol, step 520. When the error criterion has been satisfied the relative speed factor for each variable speed pump is calculated by finding the root of Equations (1a) or (1b) depending of the equation selected to represent the pump, step 522.

In accordance with another aspect of the invention, various variable speed pump operating scenarios, for example pump shut downs and start ups, can be taken into account using the method of the present invention depending upon the control status of the network at any point in time. Control status is updated at the beginning of each new hydraulic time step as illustrated in step 528 of FIG. 5. The control status of the network affects the calculation of symmetric and non-symmetric matrix coefficients in step 508. Table 1 illustrates the combinations of node type and control status that handled as each network link is processed during step 508 and identifies the matrices whose coefficients are affected by the calculation. As described in Table 1, Node 1 is the upstream node and Node 2 is the downstream node of the link being processed. Node types that can be selected as control nodes include reservoir/tank, and variable speed pump (VSP) control nodes. Control status of a node indicates whether it has been selected as the fixed grade node for a variable speed pump and the control status of the variable speed pump. For example, if a node is not selected as a control node or the variable speed pump is is switched off, then the control status is off. Likewise, if the node is selected as a control node and the variable speed pumps status is on, then the control status is on.

The system matrix is symmetric when all variable speed pumps are off or in a situation in which there is no variable speed pump in the system. When a variable speed pump and its corresponding control node are on, then the steps for solving the non-symmetrical matrix of the present invention are employed. The network configurations that are supported by the method of the present invention are illustrated in Table 1 below.

TABLE 1

Supported Network Configurations

| Node 1 Type and Status | Node 2 Type and Status | Matrices Affected |
|---|---|---|
| Junction | Junction | $A_{ii}$, F |
|  | Reservoir/Tank ON | $A_{ii}$, F, $A_{ns}$, $F_2$ |
|  | Reservoir/Tank OFF | $A_{ii}$, F |
|  | VSP Control Node ON | $A_{ii}$, F, $A_{ns}$, $F_2$ |
|  | VSP Control Node OFF | $A_{ii}$, F, $A_{nn}$, $F_2$, $A_{ns}$, $A_{sn}$ |
| Reservoir/Tank ON | Junction | $A_{ii}$, F, $A_{ns}$, $F_2$ |
|  | Reservoir/Tank ON | $F_2$ |
|  | Reservoir/Tank OFF | $F_2$ |
|  | VSP Control Node ON | $F_2$ |
|  | VSP Control Node OFF | $A_{nn}$, $F_2$ |
| Reservoir/Tank OFF | Junction | $A_{ii}$, F |
|  | Reservoir/Tank ON | $F_2$ |
|  | Reservoir/Tank OFF | — |
|  | VSP Control Node ON | $F_2$ |
|  | VSP Control Node OFF | $A_{nn}$, $F_2$ |
| VSP Control Node ON | Junction | $A_{ii}$, F, $A_{ns}$, $F_2$ |
|  | Reservoir/Tank ON | $F_2$ |
|  | Reservoir/Tank OFF | $F_2$ |
|  | VSP Control Node ON | $F_2$ |
|  | VSP Control Node OFF | $A_{nn}$, $F_2$ |
| VSP Control Node OFF | Junction | $A_{ii}$, F, $A_{nn}$, $F_2$, $A_{ns}$, $A_{sn}$ |
|  | Reservoir/Tank ON | $A_{nn}$, $F_2$ |
|  | Reservoir/Tank OFF | $A_{nn}$, $F_2$ |
|  | VSP Control Node ON | $A_{nn}$, $F_2$ |
|  | VSP Control Node OFF | $A_{nn}$, $F_2$ |

It should be understood that the method of the present invention can be employed with a standard hydraulic network solver or other type of network solver. The invention has many advantages including a robust approach that is provided when a variable speed pump is on, which takes advantage of the form of the symmetric partition of the system matrix by using a highly optimized Cholesky factorization and solves the non-symmetric partition of the matrix separately. This is performed without minimal modification of underlying software which relies on Cholesky factorization techniques to solve the matrices describing the network. Thus, existing software can be readily improved with the extension of the present invention to take into account variable speed pumps in hydraulic networks. The present invention preserves the symmetric matrix and thus minimizes memory storage requirements because a symmetric matrix requires storage of only half of the information, as the other half has the same mirror image.

The foregoing description has been directed to specific embodiments of the invention. It will be apparent, however, that other variations and modifications may be made to the described embodiments with the attainment of some or all of the advantages of such. Therefore, it is the object of the appended claims to cover all such variations and modifications as come within the true spirit and scope of the invention.

What is claimed is:

1. A computer readable medium for estimating parameters for a variable speed pump for a hydraulic network solver application which uses nodes and links to describe a hydraulic network, comprising program instructions for performing the steps of:
   a. determining a desired operating characteristic for a selected node in the hydraulic network;
   b. establishing a matrix describing the network;
   c. incorporating the predetermined desired operating characteristic as a known value in the matrix;
   d. replacing the known operating characteristic with a delta term as one of the unknown variables, the delta term being related to the operation of a variable speed pump;
   e. separating the symmetric terms of the matrix from the non-symmetric terms of the matrix;
   f. solving the symmetric terms of the matrix;
   g. building a new matrix involving the non-symmetric terms including the delta term;
   h. solving the non-symmetric terms of the matrix;
   i. combining the symmetric and the non-symmetric scalar solutions as linear equations; and
   j. calculating desired parameters by substituting the solution into the equation for the pump and solving for the equation's root, whereby parameters are estimated for a variable speed pump.

2. The computer readable medium as defined in claim 1 comprising further program instructions for performing the step of selecting as said parameter, the relative speed factor of a variable speed pump.

3. The computer readable medium as defined in claim 1 comprising further program instructions for performing the further step of solving the non-symmetric matrix using LU factorization techniques.

4. The computer readable medium as defined in claim 2 comprising further program instructions for performing the further step of separating out the non-symmetric terms of the matrix by eliminating rows relevant to newly fixed nodes and eliminating columns relevant to newly introduced heads.

5. The computer readable medium as defined in claim 3 comprising further program instructions for performing the further step of solving a sparse symmetrical system.

6. The computer readable medium as defined in claim 4 comprising further program instructions for performing the further step of setting up non-sparse, non-symmetric matrices in which rank is equal to the number of variable speed pumps in the network.

7. The computer readable medium as defined in claim 5 comprising further program instructions for performing the further step of calculating said delta term as a difference in head correction.

8. The computer readable medium as defined in claim 2 comprising further program instructions for performing the further step of
   computing the flow and head a variable speed pump in the hydraulic network to satisfy a desired operating objective in the network.

9. The computer readable medium as defined in claim 8 comprising further program instructions for performing the further step of
   computing a relative speed factor that places the required operating point on a translated characteristic curve.

10. A system embodied in a software program for estimating parameters for variable speed pumps in hydraulic networks in association with an hydraulic network solver program that produces an hydraulic network model from an associated database describing the elements of the hydraulic network, comprising:
    means for introducing the variation in speed of a pump as a simple variation in head (H) in a virtual pipe included in the hydraulic network model; and
    means for evaluating at least one operating characteristic of said virtual pipe based on either a target head or target flow.

11. The system as defined in claim 10 further comprising:
    means for generating a matrix of equations defining energy and flow balances to be satisfied for the predetermined solution of the hydraulic system;
    means for dividing said matrix into a symmetrical portion and a non-symmetrical portion;
    means for solving the symmetrical portion of the matrix; and
    means for producing a new non-sparse, non-symmetric matrix in which rank is equal to a number of variable speed pumps.

12. The system as defined in claim 11 further comprising:
    means for determining a difference in head correction related to the variable speed pump being evaluated; and
    means for computing the difference in head correction using an LU factorization technique.

13. The system as defined in claim 12 further comprising means for computing nodal head and length flow vectors.

14. The system as defined in claim 12 further comprising determining the relative speed factor of a variable speed pump in the system meeting desired operating characteristics using a Newton-Raphson search technique.

15. The system as defined in claim 11 further comprising means for combining the solution to the symmetrical portion of the matrix and the solution to the non-symmetrical portion of the matrix to solve the hydraulic network and to produce a hydraulic network model that includes an estimation of the variable speed pump's behavior.

16. A computer implemented method of estimating parameters for a variable speed pump using a hydraulic network solver application, the computer implemented method comprising the steps of:
    a. determining a desired operating characteristic for a selected node in the hydraulic network;
    b. establishing a matrix describing the network;

c. incorporating the predetermined desired operating characteristic as a known value in the matrix;
d. replacing the known operating characteristic with a delta term as one of the unknown variables, the delta term being related to the operation of a variable speed pump;
e. separating the symmetric terms of the matrix from the non-symmetric terms of the matrix;
f. solving the symmetric terms of the matrix;
g. building a new matrix involving the non-symmetric terms including the delta term;
h. solving the non-symmetric terms of the matrix;
i. combining the symmetric and the non-symmetric scalar solutions as linear equations; and
j. calculating desired parameters by substituting the solution into the equation for the pump and solving for the equation's root, whereby parameters are estimated for a variable speed pump.

* * * * *